May 7, 1929.   J. G. TRUESDELL   1,712,317

ICE CREAM CUTTING AND MEASURING DISPENSER

Original Filed June 8, 1925   3 Sheets-Sheet 1

John G. Truesdell,
INVENTOR

BY Victor J. Evans,
ATTORNEY

WITNESS:

May 7, 1929. J. G. TRUESDELL 1,712,317
ICE CREAM CUTTING AND MEASURING DISPENSER
Original Filed June 8, 1925   3 Sheets-Sheet 2

John G. Truesdell,
INVENTOR

BY Victor J. Evans,
ATTORNEY

WITNESS:

May 7, 1929.  J. G. TRUESDELL  1,712,317
ICE CREAM CUTTING AND MEASURING DISPENSER
Original Filed June 8, 1925   3 Sheets-Sheet 3

John G. Truesdell,
INVENTOR
BY Victor J. Evans,
ATTORNEY

WITNESS:

Patented May 7, 1929.

1,712,317

UNITED STATES PATENT OFFICE.

JOHN G. TRUESDELL, OF COLORADO SPRINGS, COLORADO.

ICE-CREAM CUTTING AND MEASURING DISPENSER.

Application filed June 8, 1925, Serial No. 35,693. Renewed August 1, 1927.

This invention relates to ice cream cutting and measuring dispensers and has for its primary object to produce a simple and effective device by means of which a predetermined quantity of ice cream or the like substance may be accurately cut, measured and dispensed from ice cream or the like in bulk to a container or the like in one piece and in the form according to the shape of the dispenser.

A further object is to provide an ice cream dispensing device that cuts ice cream or the like substance with formed knives or blades and retains the same in the shape cut until dispensed.

A further object is to provide an ice cream dispensing device which may be constructed to produce various shape bricks.

A further object is to provide an ice cream cutting measuring and dispensing device that requires only two movements in its operation and does not press the frozen particles of the ice cream or the like in its filling operation, but cuts the same, therefore it is extremely easy to operate with the result that the cream and the like can be readily dispensed with no warm air mixing therewith, and a minimum amount of warm air coming in contact therewith from its course from the freezer or the like to a container.

A still further object is to provide an ice cream cutting and dispensing device that will cut and dispense to the exact shape and volume of standard tapered or straight ice cream pails or carrying containers.

Another object is to provide a cutting and dispensing device with expansible means whereby the substance to be dispensed can be readily removed therefrom.

A further object is to provide a cutting and measuring device with which ice cream or the like may be substantially measured and transferred from the freezer to a container or the like in its expanded state, instead of pressing it to its original volume as before freezing.

Another object is to provide an ice cream cutting and measuring device that dispenses ice cream or the like without turning the same over but dispenses the top side up thereby allowing the use of imprints or designs, said imprints or designs being carried by the dispensing device and allowing the impression of such imprints and designs on the top of the dispensed ice cream or the like.

A further object is to provide a cutting and dispensing device for ice cream, ices and the like that can be partly filled with one color or flavor, and the remaining portion or the device with another color or flavor.

A still further object is to provide an ice cream cutting, measuring and dispensing device that can be easily disassembled, the parts being detachable for that purpose.

Another object is to provide an ice cream cutting and measuring device that functions to separate the cutting means therefrom when the cream is being dispensed with the result that the separation of the cream from the device is insured.

This invention also consists of certain other features of construction and in the combination and arrangement of the several parts to be hereinafter fully described and illustrated in the accompanying drawings and specifically pointed out in the appended claims.

In describing my invention in detail reference will be had to the accompanying drawings wherein like characters denote like or corresponding parts throughout the several views and in which.

Figure 1:
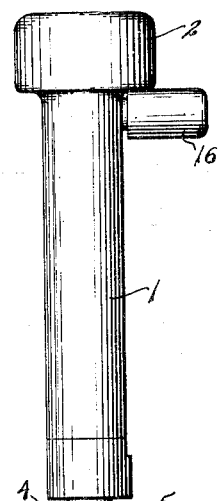
Figure 1 is a side elevation of the device forming the subject matter of the said invention.
Figure 2:
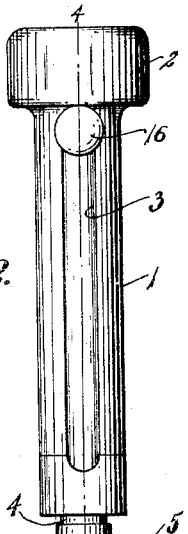
Figure 2 is an end view thereof.
Figure 3:
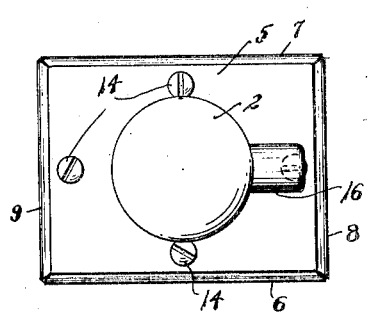
Figure 3 is a top plan view.

Referring to the drawings in detail the reference numeral 1 indicates the handle which is hollow and enlarged at its upper end as at 2 to provide a convenient hand hold as will be readily apparent. The handle is formed with an elongated slot 3 longitudinally disposed therein and arranged in the hollow portion thereof is a tubular member 4 which is provided with a similar slot registering with the slot in the handle. The tubular member extends below the lower end of the handle and has integrally formed thereon a plate 5 with the passage of the tubular member extending therethrough as clearly shown in Figures 4 and 5 of the drawings.

The container portion of the device is formed by expansible walls made up of side sliding knife or blade walls 6 and 7 and end sliding knife or blade walls 8 and 9, cooperatively associated and being adapted to slide over a plunger or base into the ice cream or the like for cutting the same as will be presently described. Each of the knife or blade walls is provided with an elongated slot 9' arranged centrally and longitudinally therein, and the ends of these slots form a stopping means for the plunger or base above referred to.

Figure 6:
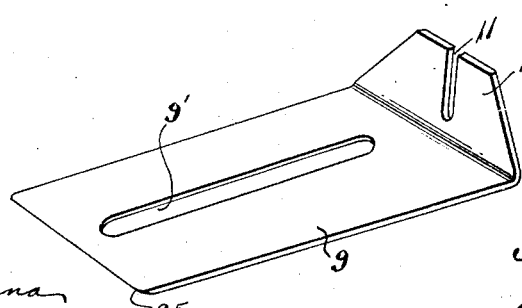
Figure 6 is a detail view of one of the cutting knives or blade walls thereof.

As shown in the drawings the knife or blade walls may be of tapered configuration and have their upper ends bent at an angle to form a flange 10 thereon which is provided with a recess 11 which extends from the central portion of the free end of the flange and terminates adjacent the juncture of the flange with its wall as shown in Figure 6 of the drawings.

Riveted to the push plate 5 is a plate 12 which has centrally depending therefrom a tubular element 13 aligned with the tubular member 4. The plates 5 and 12 form a guiding means for the flanges 10 which have their side edges tapered and arranged in confronting relation with each other. The rivets 14 which are shown as retaining the plates together, pass through the recesses 11 of the respective flanges whereby the flanges together with the side and end knife or blade walls are mounted for slidable movement as suggested in Figures 4 and 5 of the drawings.

Mounted for reciprocation in the tubular member 4 and tubular element 13 respectively, is a plunger rod 15 which has secured to its upper end a thumb or holding piece 16, the thumb or holding piece being reduced as at 17 adjacent its connection with the rod to provide a substantial bearing surface for movement in the slot of the handle and tubular member 4.

Figure 4:
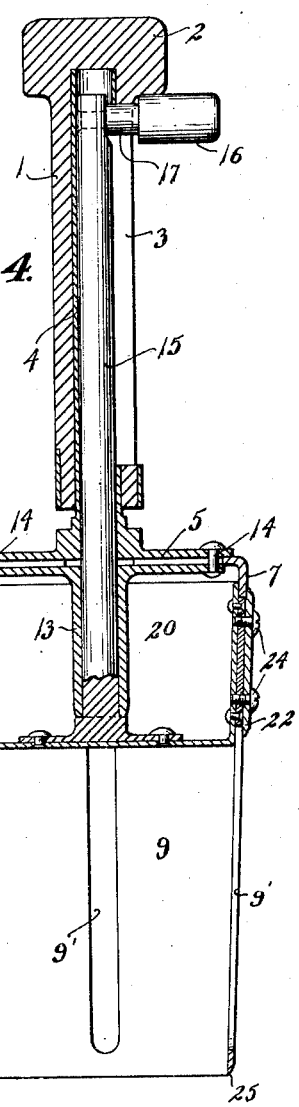
Figure 4 is a sectional view taken on line 4—4 of Figure 2.

Secured to the lower end of the rod 15 is a hollow plunger or base portion 20 which is above referred to and the walls of which diverge upwardly and have secured thereto in spaced relation therewith substantially T-shaped retainer and scraper plates 22. In the space between the walls of the hollow plunger or base portion 20 and the scraper plates 22 are slidably received the knife or blade walls, and screws 24 pass through openings in the retainer and scraper plates 22, and these screws are threaded in the walls of the plunger or base portion by passing through the slots 9' of the knife or blade walls as shown in Figure 4. The retainer or scraper plates 22 are operatively associated with the knife or blade walls for scraping the exterior thereof when the dispenser is being filled. When the knife or blade walls are moved in a downward direction over the plunger or base portion of the dispenser, they cut downwardly and inwardly toward each other and outwardly toward the corners of the plunger or base portion, the walls being sharpened on their bottom edges as at 25 and on their side edges to the height of the container portion of the dispenser. The knife or blade walls expand and contract only in their relation with the plates 5 and 12 and to the extent of the taper of the walls of the plunger or base portion. The longitudinal movement of the knife or blade walls is limited to the length of the elongated slots 9', and the lateral movement of the walls is determined by the extent of the taper of the walls of the plunger or base portion.

Figure 7:
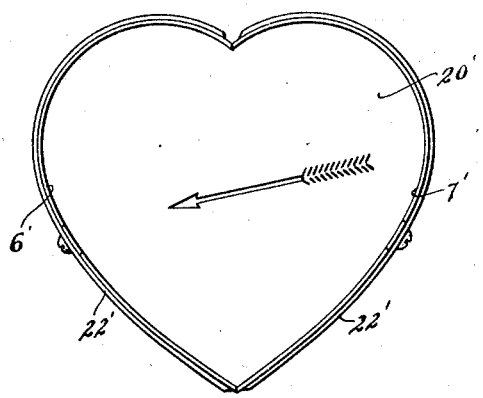
Figure 7 is a bottom plan view of a modified form.
Figure 8:
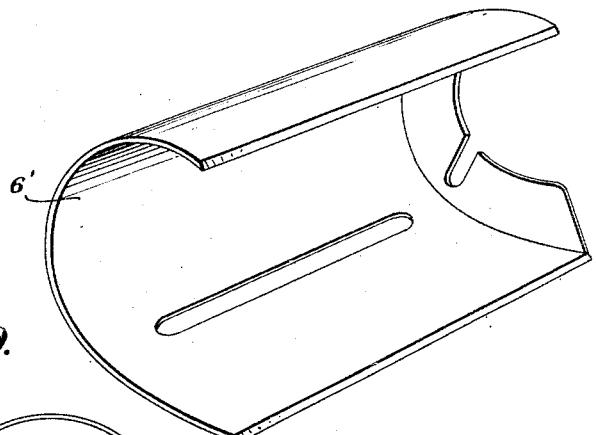
Figure 8 is a detail view of the cutting knife or blade wall of the modified form.
Figure 9:
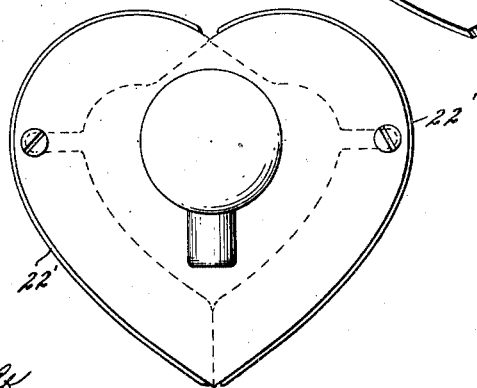
Figure 9 is a top plan view of the modified form.

In the modified form as shown in Figures 7 to 9 the principle of construction is the same as in the preferred form, but it will be noted that the walls of the container portion in this form are of different shape in cross section and for the sake of designation are indicated by the reference numerals 6' and 7'. The plunger or base portion 20' is heart shaped and the retainer or scraper plates 22' follow the curvature of the semi-heart shaped walls 6' and 7' and function in the same manner as the plates in the preferred form. From the structure of the modified form it will be apparent that a cross sectional heart shaped brick of ice cream and the like can be cut and dispensed.

Figure 5:
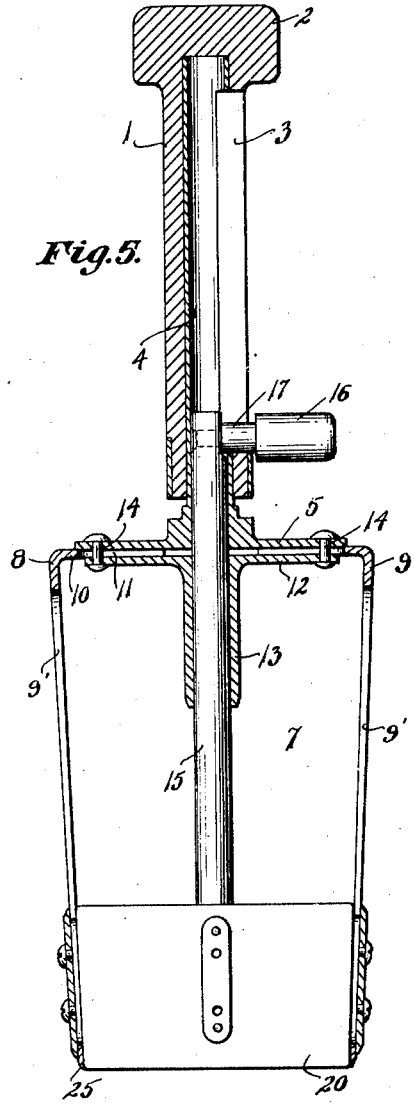
Figure 5 is a vertical sectional view taken through the device with the plunger in its lowermost position.

From the above description and drawings it will be readily apparent that the device which forms the subject matter thereof is extremely simple and may be described as follows:

When it is desired to fill a device with ice cream or the like, the plunger or base portion 20 and plunger rod 15 must be in their lowermost position as shown in Figure 5. Setting the plunger or base portion 20 on top of the cream or the like, pressure is applied to the handle portion causing side and end knife or blade walls 6 and 7, 8 and 9 to move downward over the plunger or base portion conforming therewith, said blades cut into the cream or the like thereby cutting the desired shapes and sizes in which the dispenser is made.

The blades 6, 7, 8 and 9 being sharpened on their bottom and side edges to such an extent, as they enter the cream or the like, they will not press the frozen particles of the cream or the like but will cut the same with the result that the device can be readily filled with very little effort on the part of the operator. When the device is removed from the bulk ice cream or the like it will be filled and ready to be dispensed in a pail or carrying container, the plunger or base 20 and connecting or plunger rod 15 is then positioned as shown in Figure 4 of the drawings. In dispensing the ice cream or the like from the cutting and measuring device to a container or the like, the base 20 and plunger rod 15 are held by the thumb or holding piece 16, and the blades, 6, 7, 8 and 9 are pulled up over the plunger or base portion 20 by the handle through the medium of pressure applied to the plate 5, with the result that the ice cream and the like will be dispensed as will be readily apparent.

It is thought from the foregoing description that the advantages and novel features of my invention will be readily apparent.

I desire it to be understood that I may make changes in construction and in the combination and arrangement of the several parts provided that such changes fall within the scope of the appended claims.

What I claim is:

1. A dispensing device of the character described comprising expansible walls, flanges formed on said walls, means for slidably receiving said flanges, a handle rising from said means, a plunger rod mounted for reciprocation in said handle, a plunger having tapered walls and secured to the lower end of said plunger rod, scraper blades secured to said plunger and slidable on the exterior surface of said expansible walls upon the reciprocation of the plunger rod and together with said plunger move said expansible walls away and toward each other for the purpose specified.

2. An ice cream cutting and measuring dispenser having formed walls, a flange formed on each wall, means slidably receiving the flanges of the walls, a handle rising from said means, a plunger having tapered walls and slidable on the blade walls, a plunger rod secured to said plunger and mounted for reciprocation in said handle, scraper blades movable on said blade walls and being secured to said plunger and said plunger and scraper blades respectively being adapted to move said blade walls inwardly and outwardly when said plunger rod is reciprocated.

3. A cutting device of the character described comprising a hollow handle having an elongated slot laterally formed therein, a tubular member arranged in said handle and being provided with a slot registering with the slot first mentioned, a plate integrally formed with the lower end of said tubular member, a second plate secured to the first mentioned plate in spaced relation thereto, blade walls, flanges formed on the upper end of said blade walls and being slidably mounted between the plates, a rod mounted for reciprocation in the tubular member and through the plates respectively, means for reciprocating said rod, a hollow plunger having tapered side walls and fixed to the lower end of said rod, scraper blades secured to the plunger and slidable on the blade walls, and said plunger and scraper blades being associated with the blade walls in a manner to contract and expand said blade walls upon movement of the plunger by the rod.

4. An ice cream cutter and dispenser of the character described comprising laterally movable side and end walls each being provided with a longitudinal slot, substantially right angled inwardly extending cooperatively associated flanges formed on each wall, a pair of spaced plates slidably receiving therebetween the flanges, a hollow handle rising from one of said plates, a plunger rod mounted for reciprocation in said handle, a hollow plunger secured to the lower end of said rod and being provided with tapered side walls slidable on the side and end walls, scraper blades also slidable on said side and end walls, means passing through the slots of the walls for securing said scraper blades to the hollow plunger for movement therewith when the rod is reciprocated and the movement of the plunger and scraper blades on the side and end walls move said side and end walls outwardly and inwardly for the purpose specified.

5. An ice cream cutting and measuring device of the character described comprising a hollow handle, a tubular member secured therein and being provided with a laterally disposed slot registering with a like slot in the handle, a plate formed on the lower end of said tubular member, a bearing member fixed to said plate in spaced relation thereto, longitudinally movable side and end blade walls cooperatively associated and being inclined inwardly toward each other, substantially right angled disposed flanges formed on the upper end of said blade walls and being interposed between the plate and bearing member for slidable movement, a rod mounted for reciprocation through the bearing member and tubular member respectively, a thumb piece extending laterally from said rod for movement in the slots of a hollow handle and tubular member, a hollow plunger secured to the lower end of said rod for guiding the movements of said side and end blade walls in their longitudinal movements over the walls of the hollow plunger.

6. A device of the class described, including, in combination, a body of frusto-pyramid formation to provide side walls converging downwardly towards each other, a plurality of slotted plates, one on each exterior side of said body, and screws extending into said body and extending through the slots of the plates and engaged in the exterior of the sides.

7. A device of the class described, including, in combination, a body of frusto-pyramid formation to provide side walls converging downwardly towards each other, a plurality of slotted plates, one on each exterior side of said body, and screws extending into said body and extending through the slots of the plates and engaged in the exterior of the sides, the lower edges of the plates being bevelled to provide cutting edges.

In testimony whereof I affix my signature.

JOHN G. TRUESDELL.